(12) United States Patent
Hyatt et al.

(10) Patent No.: US 10,226,917 B2
(45) Date of Patent: Mar. 12, 2019

(54) POWDER DELIVERY SYSTEMS AND METHODS FOR ADDITIVE MANUFACTURING APPARATUS

(71) Applicant: DMG Mori Seiki USA, Hoffman Estates, IL (US)

(72) Inventors: Gregory A. Hyatt, South Barrington, IL (US); Jennifer Lynn Bennett, Gilberts, IL (US)

(73) Assignee: DMG MORI SEIKI USA, Hoffman Estates, IL (US)

( * ) Notice: Subject to any disclaimer, the term of this patent is extended or adjusted under 35 U.S.C. 154(b) by 0 days.

(21) Appl. No.: 15/221,116

(22) Filed: Jul. 27, 2016

(65) Prior Publication Data

US 2017/0028631 A1 Feb. 2, 2017

Related U.S. Application Data

(60) Provisional application No. 62/197,153, filed on Jul. 27, 2015.

(51) Int. Cl.
| | |
|---|---|
| *B65G 53/42* | (2006.01) |
| *B33Y 30/00* | (2015.01) |
| *B33Y 10/00* | (2015.01) |
| *B05B 7/14* | (2006.01) |
| *B22F 3/105* | (2006.01) |
| *B23K 26/342* | (2014.01) |
| *B29C 64/153* | (2017.01) |

(Continued)

(52) U.S. Cl.
CPC ............ *B33Y 30/00* (2014.12); *B05B 7/1468* (2013.01); *B22F 3/1055* (2013.01); *B23K 26/147* (2013.01); *B23K 26/342* (2015.10); *B29C 64/153* (2017.08); *B29C 64/35* (2017.08); *B29C 64/386* (2017.08); *B33Y 10/00* (2014.12); *B22F 3/004* (2013.01); *B22F 2003/1057* (2013.01); *B29L 2009/00* (2013.01); *B33Y 40/00* (2014.12); *Y02P 10/295* (2015.11)

(58) Field of Classification Search
CPC ....... B65G 53/42; B65G 53/44; B22F 3/1055; B22F 3/003; B33Y 30/00; B33Y 40/00
USPC .......................................................... 406/106
See application file for complete search history.

(56) References Cited

U.S. PATENT DOCUMENTS 3,871,630 A * 3/1975 Wanetzky ............... B22F 3/003
266/156
4,202,498 A * 5/1980 Lestradet ............. A01C 23/047
239/156

(Continued)

OTHER PUBLICATIONS

International Search Report Application No. PCT/US2016/044262 dated Oct. 31, 2016.

*Primary Examiner* — Joseph A Dillon, Jr.
(74) *Attorney, Agent, or Firm* — Miller, Matthias & Hull LLP

(57) ABSTRACT

A powder delivery system for use in an additive manufacturing device includes a powder control valve configured to selectively divert at least a portion of an input fluid flow to a return line while a remainder of the input flow is delivered to a delivery nozzle. In some embodiments, the powder delivery valve may be modulated to alter the percentage of input flow diverted to the return line. Alternatively, the powder delivery valve may be either fully open or closed. In each embodiment, the powder delivery valve permits rapid changes in the amount of powder delivered to the nozzle.

10 Claims, 5 Drawing Sheets

(51) Int. Cl.
  *B29C 64/386* (2017.01)
  *B29C 64/35* (2017.01)
  *B23K 26/14* (2014.01)
  *B29L 9/00* (2006.01)
  *B33Y 40/00* (2015.01)
  *B22F 3/00* (2006.01)

(56) References Cited

U.S. PATENT DOCUMENTS

| | | | | |
|---|---|---|---|---|
| 4,314,669 A * | 2/1982 | Moos | ................... | B05B 7/1454 |
| | | | | 118/312 |
| 4,389,949 A * | 6/1983 | Heep | ...................... | F23N 1/002 |
| | | | | 110/101 CB |
| 4,599,017 A * | 7/1986 | Russemeyer | ......... | B65G 53/16 |
| | | | | 406/156 |
| 4,770,344 A * | 9/1988 | Kaiser | ................. | B05B 7/1468 |
| | | | | 239/124 |
| 4,812,086 A * | 3/1989 | Kopernicky | .......... | B65G 53/60 |
| | | | | 406/106 |
| 4,900,200 A * | 2/1990 | Harumoto | .............. | B65G 53/26 |
| | | | | 406/106 |
| 5,011,714 A * | 4/1991 | Takahashi | ............ | B05C 5/0254 |
| | | | | 427/128 |
| 5,021,149 A * | 6/1991 | Geisseler | ................. | B07B 4/02 |
| | | | | 209/141 |
| 5,184,730 A * | 2/1993 | Paul | .................... | B01F 13/0244 |
| | | | | 209/139.1 |
| 6,821,060 B2 * | 11/2004 | McTurk | ................ | B01F 3/1271 |
| | | | | 241/160 |
| 6,945,470 B2 * | 9/2005 | Kia | ......................... | B05B 12/14 |
| | | | | 118/302 |
| 7,882,797 B2 * | 2/2011 | Forsbring | ......... | A61F 13/15658 |
| | | | | 118/300 |
| 8,936,416 B2 * | 1/2015 | Stutz, Jr. | ................ | B65G 53/40 |
| | | | | 222/400.5 |
| 9,302,482 B2 * | 4/2016 | Okano | ....................... | B41J 2/02 |
| 9,657,740 B2 * | 5/2017 | Mauchle | .............. | B05B 7/1404 |
| 9,688,486 B2 * | 6/2017 | Henke | ................... | G01F 11/282 |
| 10,029,416 B2 * | 7/2018 | Johnson | ................. | B05B 17/04 |
| 2001/0012588 A1 * | 8/2001 | Kaido | .................... | H01M 4/04 |
| | | | | 429/233 |
| 2002/0020461 A1 * | 2/2002 | Platsch | ................. | B05B 7/1404 |
| | | | | 141/153 |
| 2002/0171183 A1 * | 11/2002 | McGregor | .............. | B22F 3/004 |
| | | | | 266/86 |
| 2003/0042339 A1 * | 3/2003 | Dankert | ................ | B05B 15/061 |
| | | | | 239/600 |
| 2003/0206820 A1 | 11/2003 | Keicher et al. | | |
| 2003/0226576 A1 * | 12/2003 | Gray | ......................... | B08B 3/12 |
| | | | | 134/1 |
| 2007/0193510 A1 * | 8/2007 | Saijo | .................... | C23C 18/1619 |
| | | | | 118/429 |
| 2007/0262174 A1 * | 11/2007 | Oden | .................... | B05B 7/1495 |
| | | | | 239/428 |
| 2008/0286441 A1 * | 11/2008 | Chang | .................... | G03F 7/162 |
| | | | | 427/8 |
| 2009/0277980 A1 * | 11/2009 | Otte | ...................... | B01L 3/0268 |
| | | | | 239/690 |
| 2009/0285643 A1 * | 11/2009 | Brown | ...................... | B60P 1/60 |
| | | | | 406/41 |
| 2011/0233808 A1 * | 9/2011 | Davidson | ............... | B33Y 30/00 |
| | | | | 264/71 |
| 2012/0145683 A1 | 6/2012 | Miyagi et al. | | |
| 2013/0045380 A1 * | 2/2013 | Lewis | ................ | C08G 18/3203 |
| | | | | 428/339 |
| 2014/0261114 A1 * | 9/2014 | Stegelitz | ................. | F23K 1/00 |
| | | | | 110/347 |
| 2014/0356079 A1 * | 12/2014 | Rusterholz | ............. | B65G 51/02 |
| | | | | 406/147 |
| 2015/0028055 A1 * | 1/2015 | Hayama | ................. | B05C 5/025 |
| | | | | 222/55 |
| 2015/0224522 A1 * | 8/2015 | Fulkerson | ................ | B05B 1/14 |
| | | | | 427/180 |
| 2016/0113298 A1 * | 4/2016 | Halse | ..................... | A22C 25/08 |
| | | | | 406/106 |
| 2017/0239730 A1 * | 8/2017 | Shirakawa | ............ | B05B 7/1468 |

\* cited by examiner

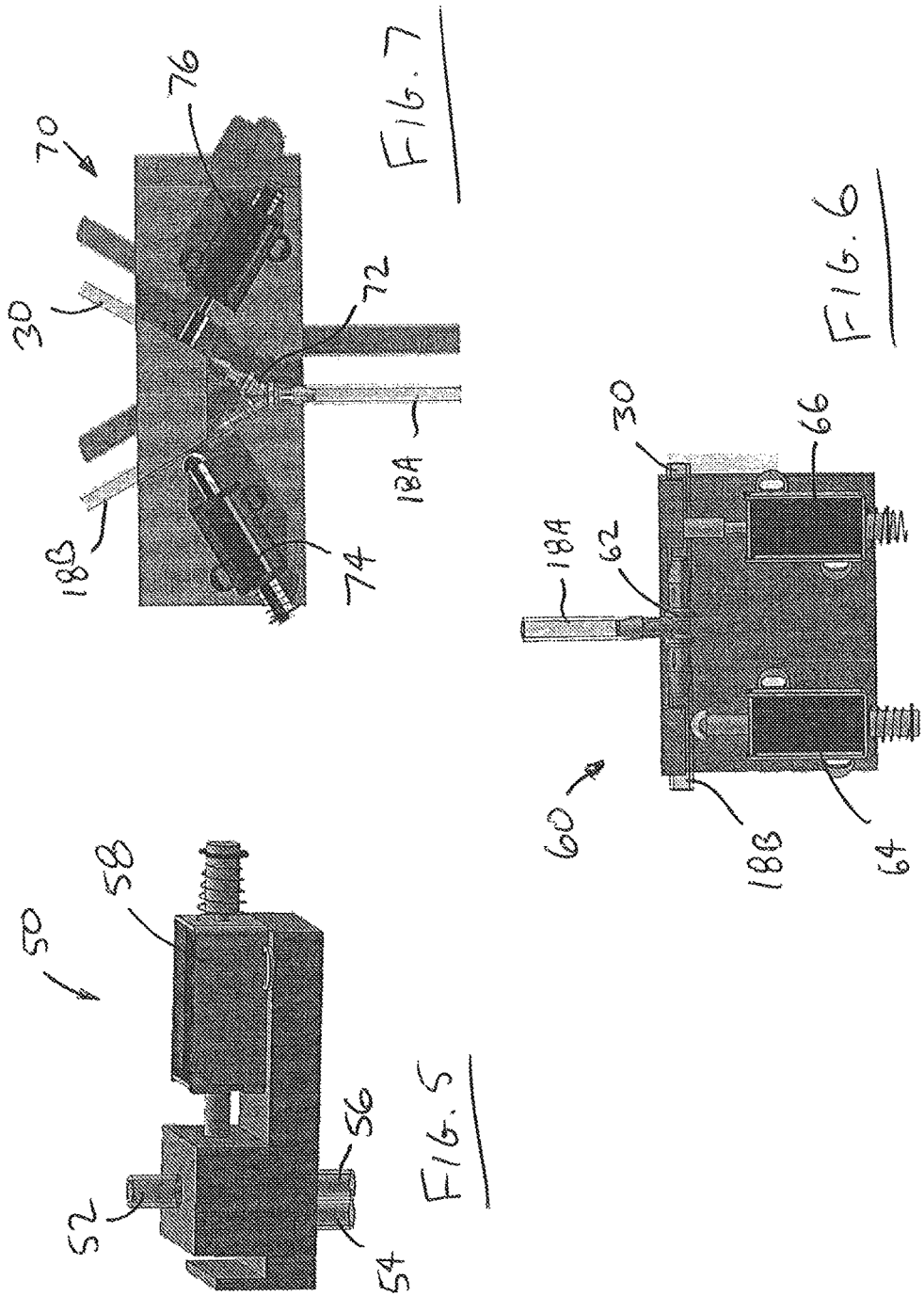

POWDER DELIVERY SYSTEMS AND METHODS FOR ADDITIVE MANUFACTURING APPARATUS

BACKGROUND

Technical Field

The present disclosure generally relates to additive manufacturing, and more particularly, to powder delivery systems and methods used in additive manufacturing apparatus.

Description of the Related Art

Traditionally, materials are processed into desired shapes and assemblies through a combination of rough fabrication techniques (e.g., casting, rolling, forging, extrusion, and stamping) and finish fabrication techniques (e.g., machining, welding, soldering, polishing). Producing a complex assembly in final, usable form ("net shape"), which often may require not only forming the part with the desired materials in the proper shapes but also providing the part with the desired combination of metallurgical properties (e.g., various heat treatments, work hardening, complex microstructure), typically requires considerable investment in time, tools, and effort.

One or more of the rough and finish processes may be performed using manufacturing centers, such as Computer Numerically Controlled (CNC) machine tools. CNC machine tools use precisely programmed commands to automate the manufacturing process. The commands may be generated using computer-aided design (CAD) and/or computer-aided manufacturing (CAM) programs. Examples of CNC machines include, but are not limited to, mills, lathes, mill-turns, plasma cutters, electric discharge machines (EDM), and water jet cutters. CNC machining centers have been developed which provide a single machine having multiple tool types that is capable of performing multiple different machining processes. Such machining centers may generally include one or more tool retainers, such as spindle retainers and turret retainers holding one or more tools, and a workpiece retainer, such as a pair of chucks. The workpiece retainer may be stationary or move (in translation and/or rotation) while a tool is brought into contact with the workpiece, thereby performing a subtractive manufacturing process during which material is removed from the workpiece.

Because of cost, expense, complexity, and other factors, additive manufacturing techniques have been developed that would replace all or part of the conventional subtractive manufacturing steps. In contrast to subtractive manufacturing processes, which focus on precise removal of material from a workpiece, additive manufacturing processes add material, typically in a computer-controlled environment, by creating successive layers of material to form a three-dimensional object. Additive manufacturing techniques may improve efficiency and reduce waste while expanding manufacturing capabilities, such as by permitting seamless construction of complex configurations which, when using conventional manufacturing techniques, would have to be assembled from a plurality of component parts. For the purposes of this specification and the appended claims, the term 'plurality' consistently is taken to mean "two or more." The opportunity for additive techniques to replace subtractive processes depends on several factors, such as the range of materials available for use in the additive processes, the size and surface finish that can be achieved using additive techniques, and the rate at which material can be added. Additive processes may advantageously be capable of fabricating complex precision net-shape components ready for use. In some cases, however, the additive process may generate "near-net shape" products that require some degree of finishing.

Additive manufacturing techniques include, but are not limited to, powder bed fusion processes such as laser sintering, laser melting, and electron beam melting; direct energy deposition processes such as laser engineered net shaping direct metal/material deposition, and laser cladding; material extrusion such as fused deposition modeling; material jetting including continuous or drop-on-demand; binder jetting; vat polymerization; and sheet lamination including ultrasonic additive manufacturing. In some direct energy deposition processes, powder is injected from one or more nozzles into a focused beam of a laser to melt a small pool of the substrate material. Powder contacting the pool will melt to generate a deposit on the substrate.

Material deposition systems used in additive manufacturing devices typically use open-loop control to provide a constant powder flow rate to the nozzle. This approach can introduce inconsistencies in deposition track morphology when the steady state is disturbed, such as acceleration or deceleration of the velocity of relative movement between the deposition head and the substrate. More recently, material deposition systems have been proposed that use a feedback system that may adjust the rate at which powder is delivered. Conventional powder delivery systems, however, may be slow to adjust to the change in powder demand, thereby slowing the additive manufacturing process and/or introducing inconsistencies in the deposited additive material.

SUMMARY OF THE DISCLOSURE

According to certain aspects of this disclosure, a powder delivery system is provided for an additive manufacturing device having a carrier gas source, a powder feeder, and a nozzle. The system includes a powder delivery line having an input section fluidly communicating with the carrier gas source and the powder feeder and an output section fluidly communicating with the nozzle. A powder control valve is disposed in the powder delivery line and has an inlet fluidly communicating with the input section of the powder delivery line, a first outlet fluidly communicating with the output section of the powder delivery line, and a second outlet, the powder control valve having a recirculation state configured to separate an input fluid flow entering the inlet into an output fluid flow supplied to the first outlet and a return fluid flow supplied to the second outlet. A return line fluidly communicates with the return port of the powder control valve, and a collector fluidly communicates with the return line.

According to additional aspects of this disclosure, a method of delivering powder to a nozzle of an additive manufacturing device is provided that includes supplying an input fluid flow of carrier gas through an input section of a powder delivery line, entraining powder into the input fluid flow, and separating the input fluid flow into an output fluid flow through an output section of the powder delivery line and a return fluid flow through a return line. The method further includes communicating the output fluid flow to the nozzle, and communicating the return fluid flow to a collector.

BRIEF DESCRIPTION OF THE DRAWINGS

For a more complete understanding of the disclosed methods and apparatus, reference should be made to the embodiment illustrated in greater detail on the accompanying drawings, wherein:

FIG. 5 is a perspective view of one embodiment of a powder control valve for use in the powder transport systems disclosed herein.

FIG. 6 is a perspective view of an alternative embodiment of a powder control valve for use in the powder transport systems disclosed herein.

FIG. 7 is a perspective view of yet another alternative embodiment of a powder control valve for use in the powder transport systems disclosed herein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Any suitable additive manufacturing apparatus may be employed in conjunction with the methods disclosed herein. In some embodiments, the methods are performed using a computer numerically controlled machine configured to perform additive manufacturing processes; however other types of systems, such as robotic systems, may be used. The machine may be an NT-series machine, versions of which are available from DMG/Mori Seiki USA, the assignee of the present application. Alternatively, DMG/Mori Seiki's DMU-65 (a five-axis, vertical machine tool) machine tool, or other machine tools having different orientations or numbers of axes, may be used in conjunction with the apparatus and methods disclosed herein.

Figure 1:
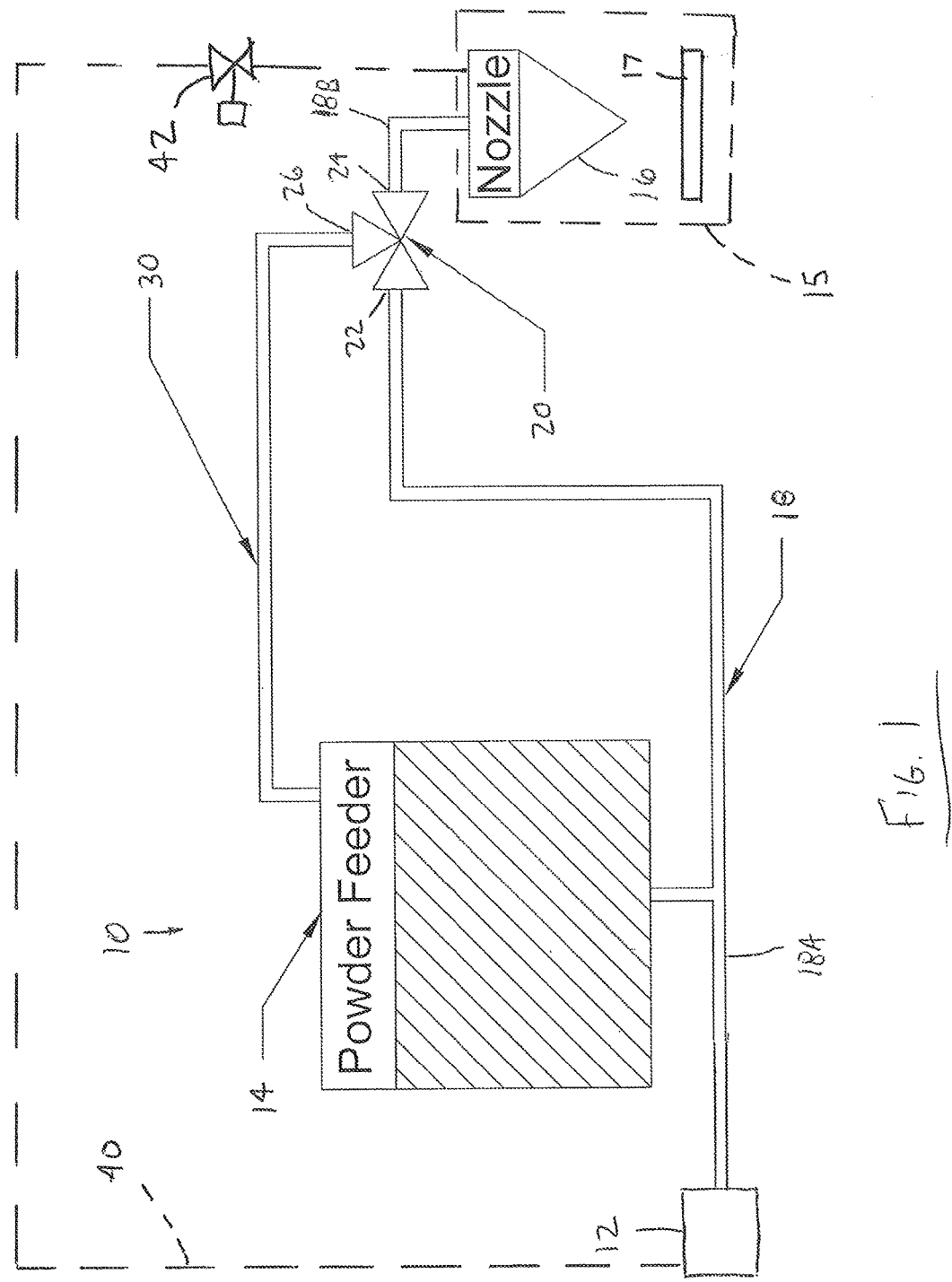
FIG. 1 is a schematic diagram of a material deposition apparatus including a powder transport system in accordance with one embodiment of the present disclosure.

FIG. 1 schematically illustrates a powder delivery system 10 of an additive manufacturing system having a source of carrier gas 12, a powder feeder 14, and a nozzle 16. The nozzle 16 may be disposed in a machining chamber 15 of the additive manufacturing system. The nozzle 16 may be directed at a substrate 17 upon which layers of additive material are to be built to create a build object. Accordingly, other components of the additive manufacturing system, such as an energy beam source and/or guide and focusing optics (not shown), may also be provided in the machining chamber 15.

A powder delivery line 18 has an input section 18A fluidly communicating with the carrier gas source 12 and the powder feeder 14, and an output section 18B fluidly communicating with the nozzle 16. The carrier gas source 12 generates an input fluid flow of carrier gas through the input section 18A and the powder feeder 14 introduces powder into the input fluid flow so that powder particles are entrained in and carried by the input fluid flow. The carrier gas may be argon, nitrogen, helium, carbon dioxide, or other gases, including blends thereof.

Figure 2:
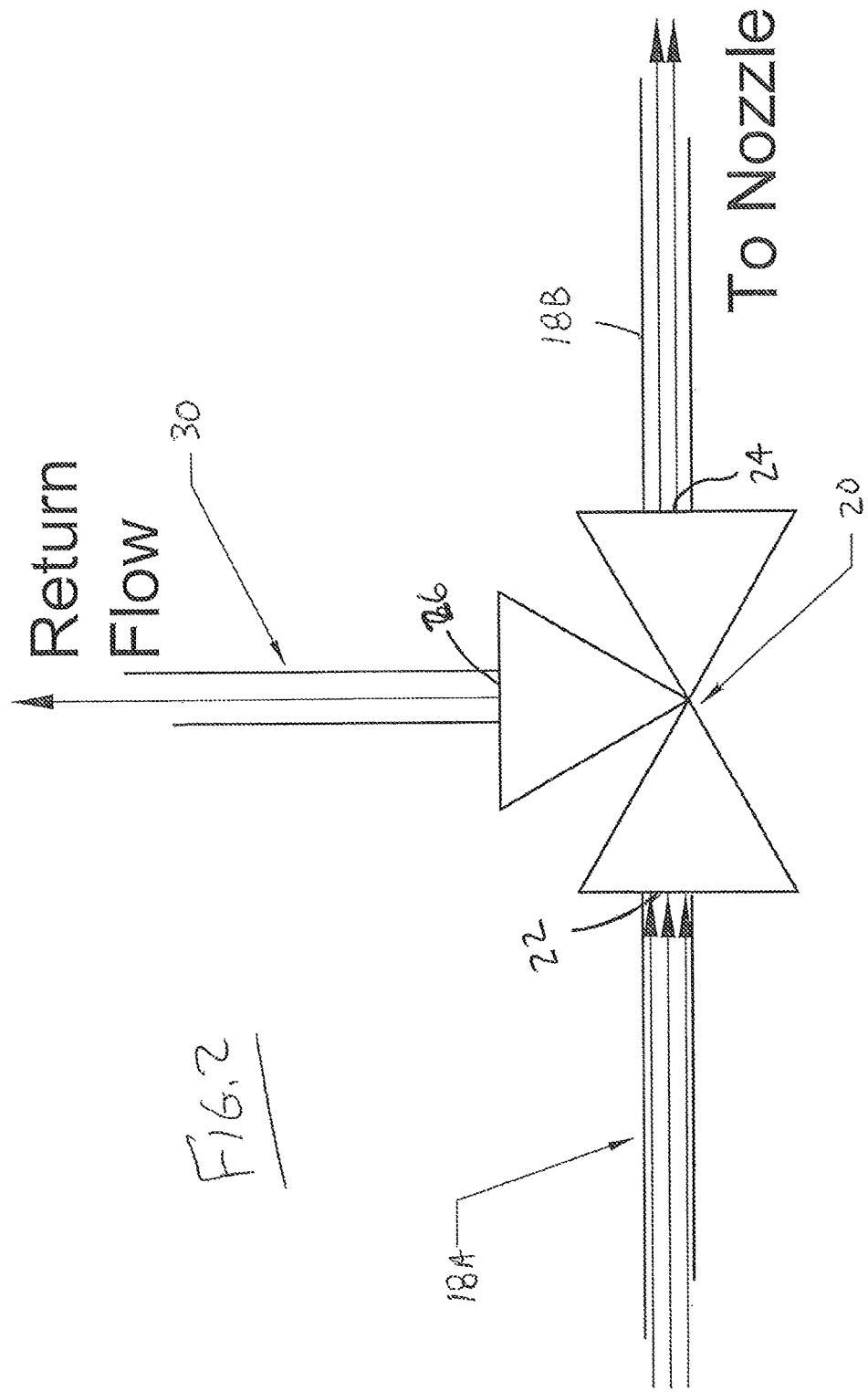
FIG. 2 is an enlarged schematic diagram of the powder transport system of FIG. 1.

The system 10 may further include a flow separator which divides the input fluid flow into an output fluid flow directed to the nozzle 16 and a return fluid flow. In the embodiment of FIG. 1, the flow separator is shown as a powder control valve 20. More specifically, and as best shown in FIG. 2, the powder control valve 20 is disposed in the powder delivery line 18 and has an input port 22 fluidly communicating with the input section 18A, an output port 24 fluidly communicating with the output section 18B, and a return port 26.

The powder control valve 20 may be set to a recirculation state, in which the powder control valve 20 is configured to separate the input fluid flow entering the input port 22 into a desired output fluid flow supplied to the output port 24 and a desired return fluid flow supplied to the return port 26. In some embodiments, the desired output and return fluid flows are fixed. For example, the desired output fluid flow may be fixed at two-thirds of the input fluid flow and the desired return flow may be fixed at one-third of the input fluid flow. Other fixed rates for the desired output and return fluid flows may be used. In embodiments providing fixed desired flows, the powder control valve 20 may have a single active position. Alternatively, the powder control valve 20 may be a binary valve having two active positions. In a first active position, the binary valve may deliver the desired fixed flows, while in the second active position, the binary valve may provide a default flow, such as directing 100% of the input fluid flow to the return port 26. Alternatively, the binary valve may have a first active position which directs all of the input flow to the output port 24 and a second active position which directs all of the input flow to the return port 26.

In other embodiments, the desired output and return fluid flows are variable. For example, the desired output and return fluid flows may be expressed as percentages of the input fluid flow, and the particular percentages for the desired output fluid flow and the desired return fluid flow may change over time. In embodiments providing variable desired fluid flows, the powder control valve 20 may be an analog or metering valve that may be modulated to provide variable flow rates for the output fluid flow and the return fluid flow. More specifically, the powder control valve 20 may be modulated to change the percentages of input fluid flow that are directed to the output port 24 and the return port 26.

Exemplary valves that may be used to provide either fixed desired fluid flows or variable desired fluid flows include three-way valves, servo-valves, proportional valves, distribution valves, electronically controlled valves, or other type of fluid flow regulating devices. Still further, the powder control valve 20 may include multiple valves to achieve the desired fixed or variable fluid flows.

Powder directed through the return port 26 of the powder control valve 20 may be routed through a return line 30 for collection and reuse. As shown in FIGS. 1 and 2, the return line 30 fluidly communicates with the return port 26 of the powder control valve 20. The return line 30 directs the return fluid flow to a collector, which in the embodiment of FIG. 1 is the powder feeder 14. In other embodiments, the collector may be a dedicated powder return tank, as discussed below.

In operation, the input fluid flow travels through the powder control valve 20, at which point it may be separated into the output fluid flow and the return fluid flow. The return fluid flow may be set such that it maintains a minimum return flow rate that is sufficient to maintain suspension of the powder particles in the carrier gas, so that the powder in the return fluid flow may be collected for reuse. Further-more, the input fluid flow may be selected such that it is sufficient to carry a mass flow rate of powder that is greater than that currently needed at the nozzle, with the excess being directed through the return line 30. As a result, should a disturbance in the additive process or change in deposition parameters increase or decrease the amount of powder needed, the powder control valve 20 may be operated to quickly meet the increased or decreased powder demand.

Exemplary embodiments of powder control valves 20 are illustrated in FIGS. 5-7. For example, FIG. 5 shows the powder control valve 20 as a slide valve assembly 50 having an input tube 52 that is slidable relative to an output tube 54 and a return tube 56. The output tube 54 may fluidly communicate with the output section 18B of the powder delivery line 18, while the return tube 56 may fluidly communicate with the return line 30. A slide actuator 58 is coupled to the input tube 52 to position the input tube 52 relative to the output and return tubes 54, 56. The slide actuator 58 may position the input tube 52 so that all of the input fluid flow enters the output tube 54, all of the input fluid flow enters the return tube 56, or portions of the input fluid flow enter both the input tube 52 and the return tube 56.

FIG. 6 illustrates the powder control valve 20 as a peristaltic pump assembly 60. The input section 18A of the powder delivery line 18 is connected to an inlet end of a T-branch 62, while the output section 18B of the delivery line 18 and the return line 30 are connected to outlet ends of the T-branch 62. An output peristaltic pump 64 engages a flexible portion of the output section 18B and a return peristaltic pump 66 engages a flexible portion of the return line 30. Rotors having shoes (not shown) are provided in the peristaltic pumps 64, 66 that are configured to pinch and roll the flexible portions as the shoes are rotated, thereby to advance fluid flow through the output section 18B and return line 30, respectively. The pumps 64, 66 may be independently controlled to operate sequentially or simultaneously to produce the desired fluid flow through the output section 18B and return line 30. By using peristaltic pumps, the powder and carrier gas are completely contained within the delivery line 18 and return line 30, thereby avoiding any potential cross-contamination between the powder and the peristaltic pump assembly 60.

Optionally, the powder delivery system 10 may provide carrier gas makeup to the nozzle 16, thereby to provide a constant delivery velocity from the nozzle. As shown in FIG. 1, a carrier gas makeup line 40 may fluidly couple a source of carrier gas, such as the carrier gas source 12, to the nozzle 16. A makeup valve 42 is disposed in the makeup line 40 for controlling flow of makeup carrier gas to the nozzle 16. The makeup valve 42 may be controlled to provide makeup carrier gas to the nozzle 16 based on the state of the powder control valve 20. For example, if the powder control valve 20 is configured to deliver 20% of the input fluid flow to the output section 18B of the powder delivery line 18 (and therefore 80% of the input fluid flow is directed to the return line 30), the makeup valve 42 may be actuated to provide a flow of pure carrier gas equal to 80% of the input fluid flow so that the nozzle 16 effectively receives a carrier gas flow that is equal to 100% of the input fluid flow. As a result, total gas flow through the nozzle, and thus nozzle velocity, remain constant regardless of the state of the powder control valve 20.

FIG. 7 illustrates an alternative powder control valve 20 in the form of an inverted peristaltic pump assembly 70. In this embodiment, the input section 18A of the powder delivery line 18 is connected to an inlet end of a Y-branch 72, while the output section 18B of the delivery line 18 and the return line 30 are connected to outlet ends of the Y-branch 72. The Y-branch 72 is oriented so that the inlet end is positioned below the outlet ends, as shown. An output peristaltic pump 74 engages a flexible portion of the output section 18B and a return peristaltic pump 76 engages a flexible portion of the return line 30. The peristaltic pumps 74, 76 operate similar to those noted above with respect to the embodiment of FIG. 6, with rotors rotating shoes (not shown) that pinch and roll the flexible portions of the tubes to advance fluid flow through the output section 18B and return line 30, respectively.

Figure 3:
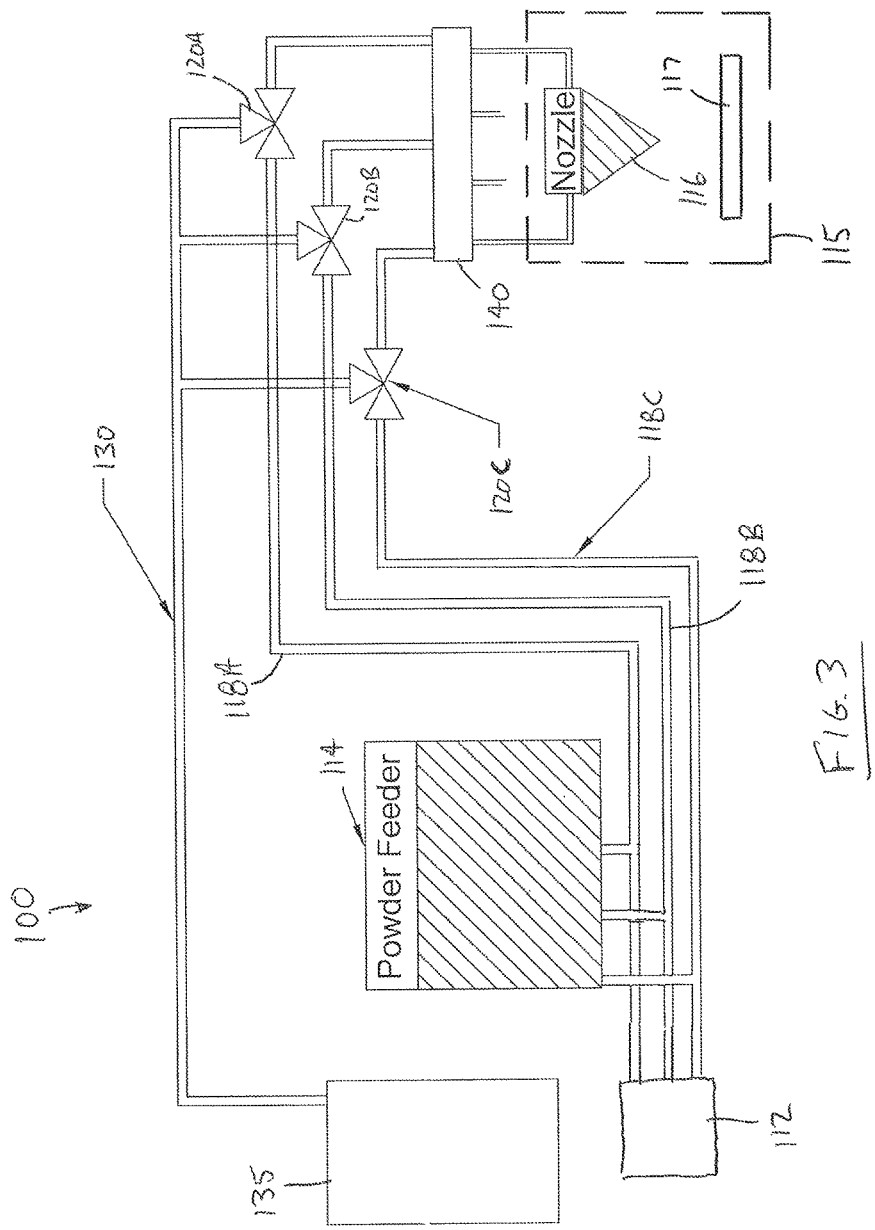
FIG. 3 is a schematic diagram of a material deposition apparatus including a powder transport system in accordance with another embodiment of the present disclosure.

FIG. 3 illustrates an alternative embodiment of a powder delivery system 100 capable of quickly switching the rate of output fluid flow to a nozzle 116 across a wider range of flow rates. The system 100 includes first, second, and third delivery lines 118A, 118B, 118C fluidly communicating with a carrier gas source 112 and a powder feeder 114. While a single carrier gas source 112 and powder feeder 114 are shown in FIG. 3, each deliver line 118A, 118B, 118C may have a dedicated gas source and powder feeder, which may permit varying blends of alloys to be deposited. First, second, and third powder control valves 120A, 120B, 120C may be disposed in the first, second, and third delivery lines 118A, 118B, 118C, respectively. Output sections of the delivery lines 118A, 118B, 118C, respectively located downstream of the powder control valves 120A, 120B, 120C, fluidly communicate with a mixing chamber 140. The mixing chamber 140, in turn, fluidly communicates with the nozzle 116. The powder control valves 120A, 120B, 120C also fluidly communicate with a return line 130 that leads to a powder return tank 135. In some embodiments, the powder return tank 135 may be maintained at atmospheric pressure or less to ensure proper operation of the system. The nozzle 116 is disposed in a machining chamber 115 of the additive manufacturing system and directed at a substrate 117 upon which layers of additive material are to be built to create a build object. Accordingly, other components of the additive manufacturing system, such as a power source and focusing optics (not shown), may also be provided in the machining chamber 115.

The first, second, and third delivery lines 118A, 118B, 118C may be sized to provide different input flows. For example, the first delivery line 118A may be sized to provide a first flow rate A to the first powder control valve 120A. The second delivery line 118B may be sized to provide a second flow rate B to the second powder control valve 120B that is different than the first flow rate A. For example, the second flow rate "B" may be twice the first flow rate A. Still further, the third delivery line 118C may be sized to provide a third flow rate C that is different than the first and second flow rates A and B. For example, the third flow rate C may be four times the first flow rate A. By providing delivery lines having different flow rates, the powder delivery system of FIG. 3 may quickly switch the amount of powder delivered to the nozzle 116. In some embodiments, the powder control valves 120A, 120B, 120C are binary and therefore movable between an off position, in which all input flow is directed to the return line 130, and an active position, in which portions of the input flow are directed to both the return line 130 and the mixing chamber 140. When using binary valves, therefore, the system is capable of providing an instantaneous change in the amount of powder delivered to the nozzle 116. In these binary valve embodiments, it will be appreciated that up to seven different, precise flow rates may be provided by opening various individual or combinations of powder control valves 120A, 120B, 120C, and that switching flow rates is virtually instantaneous. Alternatively, the powder control valves 120A, 12B, 120C may be modulating valves that provide more gradual or gradient changes in output flow rate to the return line 130 and mixing chamber 140.

Figure 4:
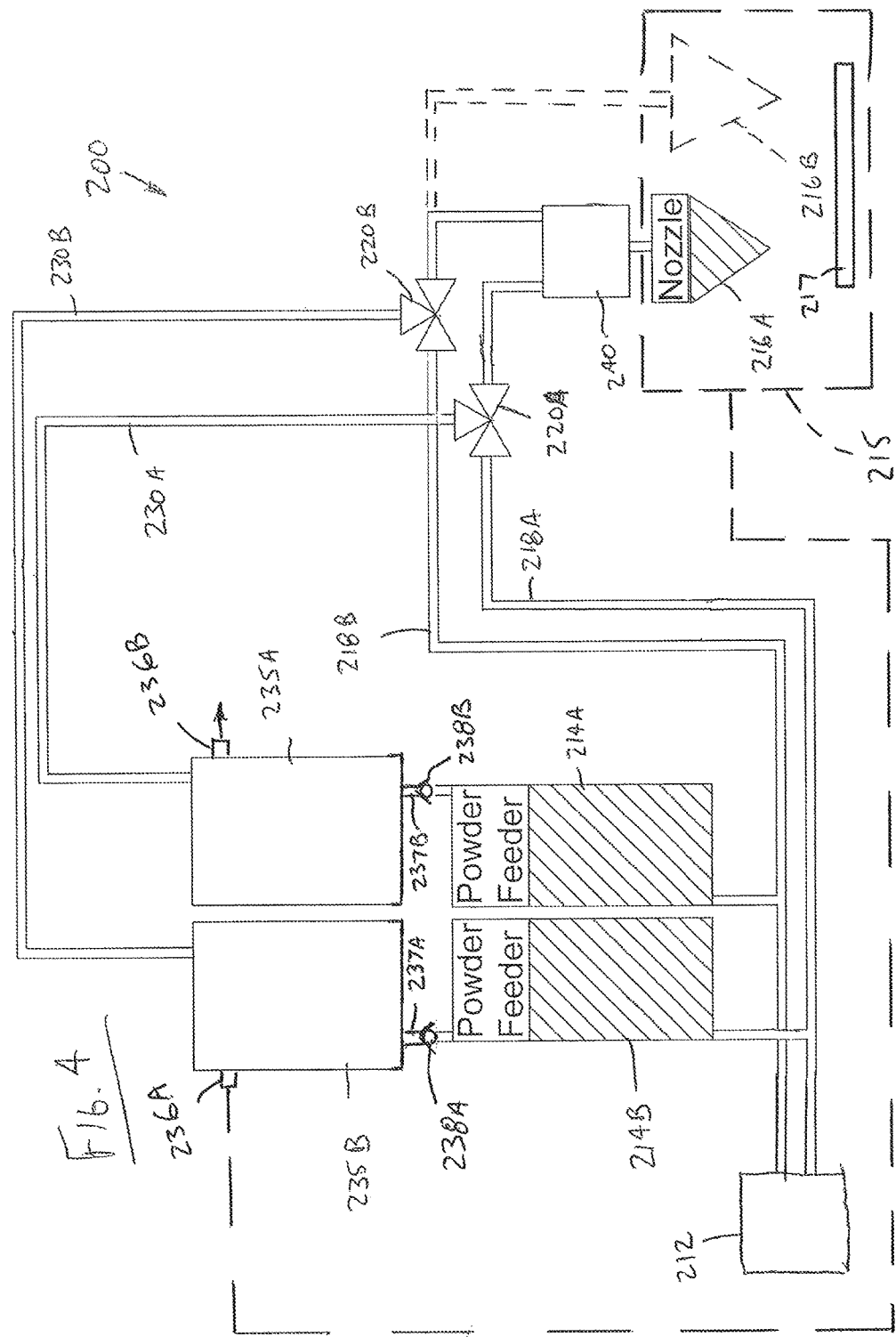
FIG. 4 a schematic diagram of a material deposition apparatus including a powder transport system in accordance with yet another embodiment of the present disclosure.

FIG. 4 illustrates a further embodiment of a powder delivery system 200 that permits the use of different powder materials and provides more direct recovery of powder routed through the return circuit. The system 200 includes first and second delivery lines 218A, 218B fluidly communicating with the same or different carrier gas sources 212. First and second powder feeders 214A, 214B respectively communicate with the first and second delivery lines 218A, 218B.

A first powder control valve 220A is disposed in the first delivery line 218A and fluidly communicates with a first nozzle 216A through an output section of the first delivery line 218A. The first powder control valve 220A also communicates with a first powder return tank 235A through a first powder return line 230A.

A second powder control valve 220B is disposed in the second delivery line 218B and may fluidly communicate with the first nozzle 216A through an output section of the second delivery line 218A. Alternatively, as shown in phantom line, the second powder control valve 220B may fluidly communicate with a second nozzle 216B separate from the first nozzle 216A. If both the first and second powder control valves 220A, 220B communicate with the first nozzle 216A, a mixing chamber 240 may be provided to combine the output fluid flows prior to reaching the nozzle 216A. The second powder control valve 220B also communicates with a second powder return tank 235B through a second powder return line 230B.

The first and second nozzles 216A, 216B may be disposed in a machining chamber 215 of the additive manufacturing system and directed at a substrate 217 upon which layers of additive material are to be built to create a build object. Accordingly, other components of the additive manufacturing system, such as a power source and focusing optics (not shown), may also be provided in the machining chamber 215.

The first and second powder return tanks 235A, 235B may be configured to separate carrier gas from the return fluid flow, thereby depressurizing the tanks 235A, 235B and permitting return powder to accumulate in the tanks 235A, 235B. For example each tank may include a vent or exhaust port in fluid communication with the surrounding environment, as illustrated by exhaust port 236B, thereby venting the return carrier gas to atmosphere. Alternatively, the return carrier gas may be reused in the additive manufacturing system, such as by fluidly coupling the exhaust port to the machining chamber 215, as illustrated by exhaust port 236A. In either embodiment, the exhaust port depressurizes the powder return tanks 235A, 235B and separates return carrier gas from the return fluid flow to permit powder to accumulate in the tanks.

The first and second powder return tanks 235A, 235B may be further configured to facilitate reuse of the powders they collect by permitting transfer of powder from the tanks 235A, 235B to the feeders 214A, 214B. As shown in FIG. 4, the first and second powder return tanks 235A, 235B fluidly communicate with the first and second powder feeders 214A, 214B, respectively, via connection lines 237A, 237B. During operation of the powder delivery system, the first and second powder feeders 214A, 214B are pressurized by the carrier gas source(s) 212 while the powder return tanks 235A, 235B are depressurized, which may prevent transfer of powder from the tanks to the feeders. Return valves 238A, 238B may be disposed in the connection lines 237A, 237B to permit powder to flow from the tanks to the feeders. More specifically, the return valves 238A, 238B may open when the powder feeders 214A, 214B are unpressurized or at a reduced pressure, thereby permitting powder to flow from the return tanks 235A, 235B. The return valves 238A, 238B may be operated by automatic mechanical actuation (i.e., as check valves or gravity driven valves that open when the mass of powder overcomes the pressure force in the feeder), manual mechanical actuation (i.e., opened directly by a user), manual electrical actuation (i.e., by triggering an actuator coupled to the valve), automatic electrical actuation (i.e., by a sensor triggering an actuator coupled to the valve), or other operation scheme.

When two different powders are respectively provided in the first and second powder feeders 214A, 214B, the alloy blend may be changed on the fly. That is, the ratio of first powder to second powder provided to the first nozzle 216A may be adjusted by modulating the first and second powder control valves 220A, 220B.

Alternatively, if the same powder is provided in both the first and second powder feeders 214A, 214B, the powder delivery system 200 may be operated continuously by switching between the powder feeders 214A, 214B. That is, while the first powder feeder 214A is supplying powder to the nozzle, the second powder feeder 214B may be taken off line and replenished, and vice versa. By toggling between the two powder feeders 214A, 214B, powder may be continuously supplied to the nozzle.

INDUSTRIAL APPLICABILITY

The powder delivery systems and methods described herein may be used to provide a flow of powder to the nozzle of an additive manufacturing device, such as a 3D printer.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the claims are deemed to encompass embodiments that may presently be considered to be less preferred. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. Additionally, aspects of the different embodiments can be combined with or substituted for one another. The description herein of any reference or patent, even if identified as "prior," is not intended to constitute a concession that such reference or patent is available as prior art against the present disclosure.

What is claimed is:

1. A powder delivery system comprising:
a machining chamber of an additive manufacturing device;
a carrier gas source of the additive manufacturing device;
a nozzle of the additive manufacturing device disposed in the machining chamber and configured to direct powder toward a substrate disposed in the machining chamber during an additive manufacturing process;
a powder feeder of the additive manufacturing device configured to hold a first powder;
a powder delivery line having an input section fluidly communicating with the carrier gas source and the powder feeder and an output section fluidly communicating with the nozzle;
a powder control valve disposed in the powder delivery line and having an inlet fluidly communicating with the input section of the powder delivery line, a first outlet fluidly communicating with the output section of the powder delivery line, and a second outlet, the powder control valve having a recirculation state configured to separate an input fluid flow entering the inlet into an output fluid flow supplied to the first outlet and a return fluid flow supplied to the second outlet;
a return line fluidly communicating with the return port of the powder control valve; and
a powder return tank provided separate from the powder feeder and fluidly communicating with the powder control valve via the return line.

2. The powder delivery system of claim 1, in which the powder control valve comprises a metering valve configured to provide variable output fluid and return fluid flows.

3. The powder delivery system of claim 1, in which the powder control valve comprises a binary valve having a first state and a second state.

4. The powder delivery system of claim 3, in which the first state of the binary valve communicates all of the input fluid flow to the first outlet, and the second state of the binary valve communicates all of the input fluid flow to the second outlet.

5. The powder delivery system of claim 1, in which the powder return tank fluidly communicates with the powder feeder of the additive manufacturing device through a connection line, and a return valve is disposed in the connection line.

6. The powder delivery system of claim 1, further comprising an exhaust port fluidly communicating between an interior of the powder return tank and an exterior of the powder return tank.

7. The powder delivery system of claim 6, in which the exhaust port is fluidly coupled to the machining chamber of the additive manufacturing device.

8. The powder delivery system of claim 1, further comprising a makeup line fluidly coupling the carrier gas source to the nozzle independent of the powder delivery line.

9. The powder delivery system of claim 1, further comprising:
a second powder feeder for dispensing a second powder;
a second powder delivery line having an input section fluidly communicating with the carrier gas source and the second powder feeder and an output section fluidly communicating with the nozzle;
a second powder control valve disposed in the second powder delivery line and having an inlet fluidly communicating with the input section of the second powder delivery line, a first outlet fluidly communicating with the output section of the second powder delivery line, and a second outlet, the second powder control valve having a recirculation state configured to separate a second input fluid flow entering the inlet of the second powder control valve into a second output fluid flow supplied to the first outlet of the second powder control valve and a second return fluid flow supplied to the second outlet of the second powder control valve;
a second return line fluidly communicating with the second outlet of the second powder control valve; and
a second powder return tank provided separate from the second powder feeder and fluidly communicating with the second powder control valve via second return line.

10. The powder delivery system of claim 9, further comprising a mixing chamber fluidly communicating with both the output section of the powder delivery line and the output section of the second powder delivery line.

* * * * *